Feb. 20, 1968  R. E. PAULSON  3,369,665
TUBULAR FILTER WITH SLIDING CASING
Filed April 27, 1967

INVENTOR:
Rueben E. Paulson
BY
James R. Hoatson, Jr.
Philip T. Liggett
ATTORNEYS United States Patent Office 3,369,665
Patented Feb. 20, 1968

3,369,665
TUBULAR FILTER WITH SLIDING CASING
Rueben E. Paulson, Fridley, Minn., assignor to Universal Oil Products Company, Des Plaines, Ill., a corporation of Delaware
Filed Apr. 27, 1967, Ser. No. 634,156
5 Claims. (Cl. 210—94)

ABSTRACT OF THE DISCLOSURE

A filter unit adapted for placement directly in a flow line and having a tubular-form slidably movable casing to permit access to the interior of the unit for cleaning purposes. A preferred construction uses a tubular-form filter screen which has slotted openings which increase in size in the direction of flow so as to reduce clogging and provide an increased efficiency. Also, there is employed an out-to-in stream flow within the unit such that all filtered solids material is retained on the outer surface of the filter section.

Specification

The present invention is directed to a tubular form of filter unit which is adapted for placement in a flow line and, more particularly, such unit is constructed in a manner to have a slidably movable tubular casing which readily permits access to the interior of the unit for cleaning purposes.

There are, of course, many types and designs of filtering apparatus which are in commercial use at this time, with such types being large or small and including operations utilizing gravity, pressure, or vacuum. All filters require cleaning or periodic change. The continuous type filters generally use rotating drums or disks with accompanying automatic scraper blade means or back-flushing means, and the like. Various types of cartridge filter units are constructed and arranged to provide for the removal of a clogged filter section and its replacement with a new section or a cleaned cartridge section such as is conventional with auto carburetor air filters, crank case oil filters, etc. However, there do not appear to be any convenient forms of small line sized filters adapted to be readily placed in a flow line carrying a fluid stream with entrained solids which should be removed from such stream. Also, conventional designs for small filter units do not generally provide for the internal access to the filtering surface of the unit so that there can be manual cleaning of a fixed in-placed filter section.

Summary of the invention

It may be considered a principal object of the present invention to provide a small unitary filtering device adapted to have a slidably movable tubular form casing which in turn will provide access to permit interior cleaning of a tubular form cleaning screen.

It may also be considered a principal object of the present invention to provide a tubular form filtering device adapted to be placed directly in a flow line or conduit so as to remove undesired entrained solid material and, in addition, provide a design and construction where there is a radially inward flow through a tubular form filtering section to in turn permit cleaning from the outer surface of the filtering section.

In a broad aspect the present invention provides an elongated filter device adapted to be placed longitudinally within a fluid conduit and have a removable slidable casing that will permit ready access to the interior of the unit and such device comprising in combination, a fluid inlet section having an end inlet port, a perforate wall portion and a flow blocking partition at an end opposing said inlet port, an elongated fluid filtering-discharge section having an outer tubular form filter screen and an end outlet port, said latter section connecting to and maintained in axial alignment with said inlet section downstream from said flow blocking partition, a slidably movable tubular casing spaced from and enclosing said inlet section and said fluid filtering-discharge section, and slip-fit seal means at each end of said casing between the latter and the end portions of said inlet and said filtering-discharge sections whereby the tubular casing may be longitudinally moved to provide cleaning access to said tubular form filtering screen.

A preferred construction of the present improved device arrangement the internal fluid inlet and the internal filtering section such that there is an out-to-in or radially inward stream flow causing all of the filtered solids material to be retained on the outer surface of the filter section. Thus, there may be easy cleaning of the filter section of the device upon sliding the casing out of the way.

A preferred design also utilizes a tubular form of filter screen or perforate section where the resulting slotted openings increase in size toward the interior wall of the unit, i.e., in the direction of flow, so as to reduce the clogging of the filter section. The diverging slots or flow paths through the filter screen section may be obtained by the utilization of tapered elements having approximate triangular or trapezoidal cross sections. The wider portion or portions are positioned toward the outside surface and the apex sections are turned inwardly to provide the inside periphery of the tubular unit such that any material which passes through the narrow outer slots or openings of the filtering screen will then reach passageways increasing in size to permit continued entrained flow. The result is a minimization of filter clogging and the holding of all filtered solids material on the outer surface of the filter section whereby it may be manually cleaned upon the removal of the filter casing or housing.

It is not intended to limit the present invention to the use of any one type of tubular material for constructing the outer slidably movable casing, however, in some instances, it may be desirable to utilize a transparent glass or plastic material such that there may be visual observation of the rate of clogging on the internal tubular form filtering screen while the unit is in operation. The glass or plastic material should of course be sufficiently thick and of a sufficiently high tensile strength material to permit the operating conditions required from the particular stream passing through the filter unit. However, for relatively low pressure operation such as encountered with conventional town or plant water systems of generally not more than 50 p.s.i.g. then there may be utilized relatively thin tubular sections of glass or plastic without danger of rupture or excessive deflection.

Reference to the accompanying drawing and the following description thereof will serve to show diagrammatically various means for constructing and operating an improved filtering device as provided under the present invention and will, in addition, assist in setting forth certain advantages in the operation of the subular form filter section with access for external cleaning.

Figure 2:
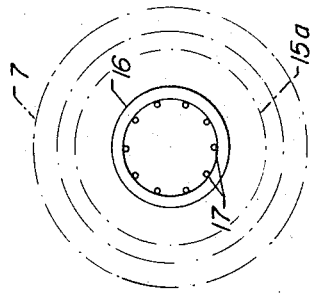
FIGURE 2 of the drawing is a partial cross-sectional view, such as along the line 2—2 in FIGURE 1, indicating the use of spirally wound triangularly shaped section around spaced longitudinal bar elements so as to provide a tubular filter element with a narrow continuous passageway means spiralling along the extreme outside surface of the filtering screen.
Figure 1:
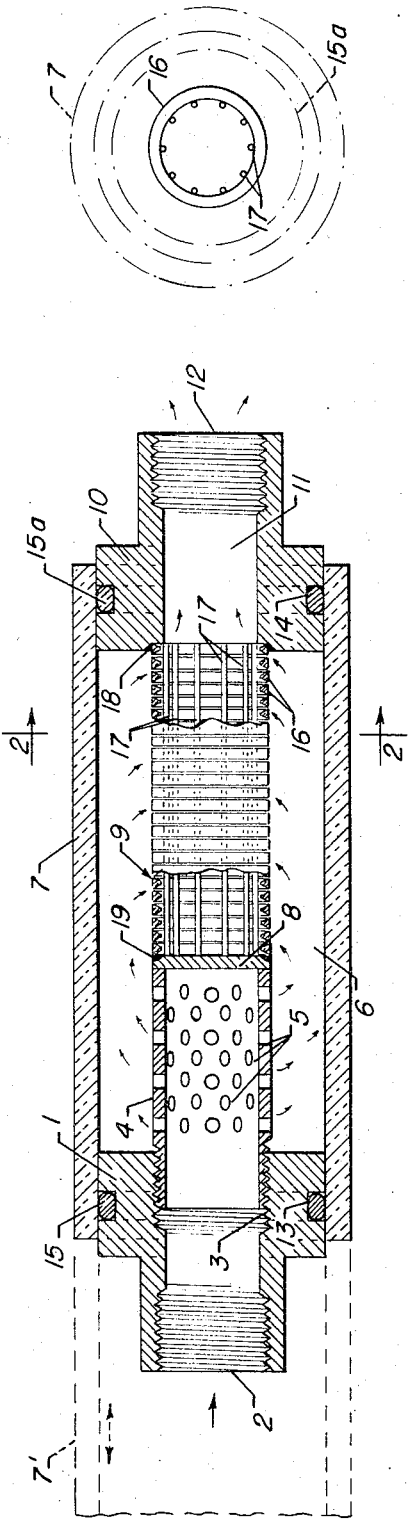
FIGURE 1 of the drawing is a longitudinal sectional view through one embodiment of an in-line filter construction having a slidable movable tubular casing to provide internal access to a tubular filter section.

Referring now particularly to FIGURES 1 and 2 of the drawing, there is shown an inlet end section 1 having an inlet port 2 and a threaded internal passageway portion 3 which is adapted to connect with and support a perforate wall tubular section 4. The latter has a plurality of relatively large holes or openings 5 which in turn serve to pass the incoming fluid stream from port 2 into an annular fluid passageway zone 6. The latter extends longitudinally along the entire inside wall of a slidably movable tubular casing 7. A non-perforate partition plate 8 is shown as extending across the innermost end portion of tubular member 4 such that the axial flow of the incoming fluid stream is caused to be diverted radially outwardly through holes 5 and into the annular space 6.

Connecting to and extending longitudinally from the transverse partition 8 is a tubular filter section 9, which in turn has its downstream end positioned against and connecting with the inside face of outlet section 10. The latter is of a similar design and construction to the inlet end section 1 in that it has a suitable fluid passageway 11 terminating in an outlet port 12 and an equal diameter external periphery to accommodate the casing 7. Both the end sections 1 and 10 are indicated as having internal threading within the end portions so as to accommodate externally threaded pipe sections to permit the ready mounting of the entire filter device in a suitable pipe line. However, where desired, each of the end sections may be provided with suitable flanges for conventional bolted connections with end flanges of a pipe line or conduit.

In addition, the peripheries or circumferential portions of each of the end sections 1 and 10 are provided with suitable notches or recess means, such as 13 and 14 respectively, to in turn permit the accommodation of suitable O-ring seals 15 and 15a. The O-ring seals, or other gasket means, are, of course, selected to be of a type adapted to hold a tight fluid seal with the inside surface of the casing 7 while the filtering device is in operation with fluid flow passing therethrough. At the same time, the seal means should be the type permitting a longitudinal force against the end of the casing section 7 to permit it to move longitudinally from an end section, such as 10, as indicated by the broken lines 7' and in turn provide internal access to the filter screen section 9. It should, however, be pointed out that the seal means 15 and 15a, as shown in the drawing, are merely diagrammatic and that where deemed desirable there may be other types of gasketing or seal ring means utilized. Also, where desired, there may be utilized multiple O-rings at each end of the device so as to increase the sealing efficiency between the movable casing 7 and the end sections 1 and 10.

In a broad aspect, it is not intended to limit the present tubular form of filtering devices, having the slidably moving casing construction, to the use of any one form of filter screen inasmuch as there are innumerable types of screen elements available to accommodate the removal of entrained solids material from a fluid stream. A particular type of screen or slotted element may be of particular advantage in connection with certain types of entrained solids and as a result be preferable for a particular filtering operation. In connection with the present design and arrangement, where it is desired to effect an external cleaning of the tubular form filtering element 9, it is generally preferable to utilize a slotted screen or filter element which will have its most narrow constrictions along the outer surface such as shown diagrammatically in FIGURE 1. In other words, by the utilization of triangularly or trapezoidally shaped elements 16 in a tubular form, there will be resulting diverging passageways between adjacent portions of the screen to preclude excessive clogging of the screen from any of the solids material which may have passed through the outer surface thereof. Also, in one type of screen construction, there may be the use of a single spirally wound triangular or trapezoidal shaped element passing around a plurality of spaced longtudinally bar rod sections 17, as best shown in FIGURE 2 of the drawing. The spiral winding of the element 16 around rod sections 17 provides that there is a continuous spiralling slot for the full length of the tubular form member 9 and, at the same time, an enlarging passage from the outer surface to the inner surface of the screen section whereby any entrained solids which pass the outer surface will continue on through the unit with minimization of internal clogging. This feature is of course of advantage where it is desired to effect the periodic cleaning of the filter element 9 from the outside thereof as the movable casing 7 is periodically moved.

Where desired, various means may be utilized for connecting the downstream end of the filter element 9 to the outlet end sections 10. For example, in a simple assembly operation there may be a soldering or welding of the end portion 18 to the internal face of the end section 10. In a modification, the end 18 may be within recess means provided in the internal face of the section 10. Also, the opposing end portion 19 may be welded or otherwise attached to the downstream face of the partitioning member 8 to effect a fixed connection of the tubular form filtering element 9 to the perforate tubular section 4. Thus, in the assembly of the device there may be a threaded connection of the upstream end of tubular section 4 with the inlet end section 1 to provide an elongated filtering unit adapted to receive the outer slidably movable casing 7.

Figure 3:
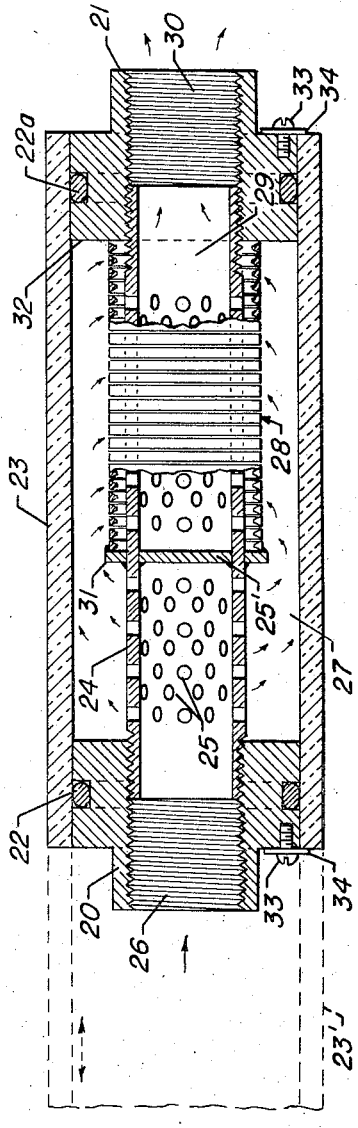
FIGURE 3 of the drawing indicates diagrammatically, and in a longitudinal sectional view, a modified construction where a tubular form filtering screen is positioned to circumscribe a portion of a full length perforate internal tube section.

In a slightly modified design and construction, as best shown in FIGURE 3 of the drawing, there is shown an internally threaded inlet end section 20 and a similarly threaded outlet end section 21 each of which is provided respectively with suitable O-ring seal means 22 and 22a adapted to provide a tight fluid seal with slidably removable casing 23. In this latter embodiment there is provided a full length perforate wall tubular member 24 having a multiplicity of perforations 25 throughout the entire distance between the inside faces of end sections 20 and 21. For assembly purposes, both end portions of tubular member 24 are threaded in order to provide a threaded engagement with the two end sections 20 and 21. An intermediate non-perforate partition 25' effects an internal flow blockage for tube 24 such that fluid entering section 20 by way of path 26 will necessarily be diverted outwardy through holes 25 into an elongated annular shaped passageway 27. The fluid flow then reverses at the downstream end of the passageway and passes radially inwardly through a filtering screen 28 into a downstream end zone 29 of tubular member 24 prior to discharge from outlet port 30.

The present embodiment also indicates an external ring section 31 around tubular member 24 so as to have means holding the filter screen member 28 in the desired downstream end portion of the unit against the inside face 32 of end section 21. In this design, it is generally not necessary to effect any welding of the end portions of filter element 28 to the end member 21 or to the ring section 31 inasmuch as the external placement of tubular filter screen member 28 around the downstream end portion of the tube 24 and the subsequent tightening of such tube into end sections 20 and 21 will effect the compression tightening of filter element 28 into the proper position.

Again, as in FIGURE 1, the outer tubular casing 23 is slidably movable in a longitudinal direction over O-ring means 22 and 22a so as to assume position 23' when it is desired to turn off the fluid flow and effect the cleaning of tubular filter screening means 28. However, in the present embodiment, there is shown set screw means 33 and washer means 34 at each end of the device in a manner to connect with the respective end sections 20 and 21 and at the same time overlap end portions of the slidable end casing 23 such that the latter is not movable during operating conditions. In other words, it is necessary to remove one set of set screw means 33 and washer means 34 at such time as it is desired to move the casing 23 into the position 23' and gain access to the external surface of the filtering screen element 28. After the cleaning operation, the casing 23 may be pushed back into position and the set screw means 33 utilized to hold the casing in its desired position.

In each instance the slidable casing means 7 and 23 for the respective FIGURES 1 and 3, have been shown as transparent like materials, however, as pointed out hereinbefore, it is not necessary to have a transparent casing section inasmuch as they may well be made of any desirable metal or non-metal as long as there is suitable tensile strength in the material to accommodate the fluid pressure being utilized in the device.

It may also be noted in connection with FIGURE 3 that the filter screen or element 28 is indicated diagrammatically as having screening elements which are of a trapezoidal shape so as to in turn provide diverging open passageways toward the interior of the tubular section and maintain a filtering action strictly on the outer surface of the entire section with the preclusion of internal clogging from any material that may tend to pass the outer portion of such filter section. Generally, the filter screen sections will be of a material of a type and nature to withstand the particular operating and corrosion conditions which may be encountered in the in-line filtering of entrained solids material in the particular fluid stream. On the other hand, the filtering section for a particular filter device may be constructed of plastic, glass, Bakelite, Formica, fiber-glass, or other suitable material, capable of being in a tubular form and of a slotted or screen like nature. In fact, where deemed desirable and suitable for the operating conditions, the entire unit including the end sections, internal tubular sections and external slidable casing may be formed of plastic, fiber-glass, Bakelite, etc., without incorporating any metallic materials whatever.

I claim as my invention:

1. A filter device with a slidable casing, which comprises in combination, a fluid inlet section having an end inlet port, a perforate wall portion and a flow blocking partition at an end opposing said inlet port, an elongated fluid filtering-dicharge section having an outer tubular form filter screen and an end outlet port, said latter section connecting to and maintained in axial alignment with said inlet section downstream from said flow blocking partition, a slidably movable tubular casing spaced from and enclosing said inlet section and said fluid filtering-discharge section, and slip-fit seal means at each end of said casing between the latter and the end portions of said inlet and said filtering-discharge sections whereby the tubular casing may be longitudinally moved to provide cleaning access to said tubular form filtering screen.

2. The device of claim 1 further characterized in that said slidably movable tubular casing is a pressure resistant substantially transparent material, whereby to permit visual clogging on said tubular form filter screen.

3. The device of claim 1 further characterized in that said tubular form filter screen for said filtering-discharge section comprises outer screening elements with a cross-section providing sloping sides, and such elements are arranged to provide slotted openings which increase in size from the outer surface to the inner surface, whereby to preclude internal clogging of said screen.

4. The device of claim 1 further characterized in that removable clamping means is provided at at least one end of said device to hold said slidable movable tubular casing from longitudinal movement during the filtering operation of the device.

5. A filter device with a slidable casing which comprises in combination, a fluid inlet section having an end inlet port and a threaded internal passageway and an opposing fluid outlet section having an outlet port and a threaded internal passageway, an internal perforate wall tubular section with threaded end portions and having an internal intermediate flow blocking partition so as to provide an inlet end portion and a filtered fluid outlet portion, said tubular section being threadedly connected to said inlet and said outlet sections, a tubular filtering screen section positioned around the discharge portion of said tubular section adapted to provide filtering for a fluid stream passing outwardly from said inlet end portion and then passing radially into said fluid outlet portion, a slidably movable tubular casing spaced from and enclosing said inlet portion and said outlet portion of said internal tubular section extending over said inlet and said outlet sections, and slip-fit seal means between the peripheries of the latter and the inside wall of said tubular casing, whereby the tubular casing may be longitudinally moved to provide cleaning access to said tubular filtering screen around the internal filtered fluid outlet portion.

References Cited
UNITED STATES PATENTS

| | | | |
|---|---|---|---|
| 3,240,342 | 3/1966 | Callahan et al. | 210—447 |
| 3,317,043 | 5/1967 | Vanderpoel | 210—232 |

FOREIGN PATENTS

| | | |
|---|---|---|
| 565,285 | 8/1958 | Belgium. |

SAMIH N. ZAHARNA, *Primary Examiner.*